United States Patent [19]

Benuzzi

[11] 4,156,376
[45] May 29, 1979

[54] DEVICE FOR DISCHARGING THE TRIM OR SCRAP IN A PANEL CUTTING MACHINE

[76] Inventor: Gino Benuzzi, 5, Via Angelo Custode, Bologna, Italy, 40100

[21] Appl. No.: 834,350

[22] Filed: Sep. 19, 1977

[30] Foreign Application Priority Data

Sep. 20, 1976 [IT] Italy .............................. 12797 A/76

[51] Int. Cl.² ............................................. B26D 7/06
[52] U.S. Cl. ...................................................... 83/157
[58] Field of Search .......................................... 83/157

[56] References Cited

U.S. PATENT DOCUMENTS

| | | | |
|---|---|---|---|
| 2,814,343 | 11/1957 | Anderson | 83/157 |
| 3,631,750 | 1/1972 | Hanni | 83/157 |
| 3,916,742 | 11/1975 | Biernot | 83/157 X |

Primary Examiner—Willie G. Abercrombie
Attorney, Agent, or Firm—Pollock, Vande Sande & Priddy

[57] ABSTRACT

A trim discharging device, for discharging the trim or scrap resulting from the trimming of the leading edge and of the trailing edge of a stack of panels fed to a cutting line on a panel support table, comprises two tiltable table portions, which by two adjacent edges define between them the cutting line. Each tiltable table portion is hinged along an axis which is parallel to the cutting line, and can be tilted so as to slope in the direction of a trim discharge zone, located below the cutting line.

2 Claims, 4 Drawing Figures

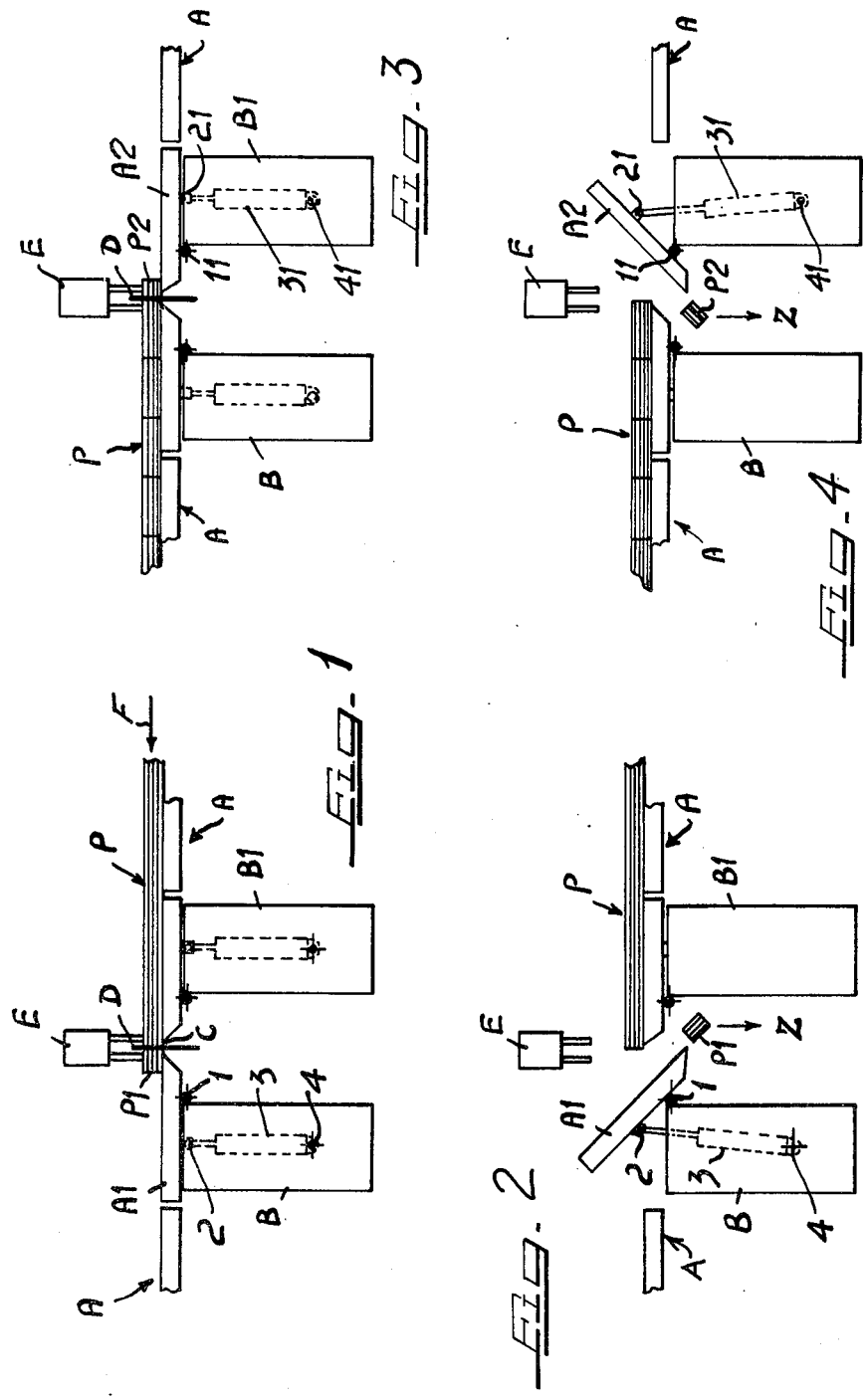

DEVICE FOR DISCHARGING THE TRIM OR SCRAP IN A PANEL CUTTING MACHINE

SUMMARY OF THE INVENTION

The object of the present invention is a device for removing or discharging the trim or scrap resulting from the rectilinear trimming of the sides, and more particularly of the leading edge and of the trailing edge, of a panel or stack of panels, effected by the cutting saw of a panel cutting machine, of the type in which the said cutting saw operates by moving across a rectilinear cutting line, and the panels are fed to the said cutting line by displacement on a panel support table which is interrupted, transversely with respect to the direction of feeding of the panels, by a rectilinear slit along which moves the cutting saw, and which coincides with the cutting line.

According to the invention, the trim discharging device is obtained by providing on the panel support table two independent tiltable portions arranged respectively at either side of the cutting line, which cutting line is more precisely defined by the adjacent edges of the said tiltable table portions. By promoting the tilting of one or of the other table portion so as to cause it to slope in the direction of a discharge area, the trim or scrap can be discharged immediately after having been cut by the cutting saw.

The above and other features and advantages of the trim discharging device according to the invention will be illustrated by the following description of a preferred embodiment, made with reference to the attached drawing.

BRIEF DESCRIPTION OF THE DRAWINGS

FIGS. 1 and 2 show diagrammatically in side elevation the trim discharging device according to the invention, respectively during the trimming of the leading edge of a stack of panels, and during the discharge of the trim or scrap.

FIGS. 3 and 4 show, similarly to FIGS. 1 and 2, the trim discharging device during the trimming of the trailing edge of a stack of panels, and during the discharge of the trim or scrap.

DESCRIPTION OF THE PREFERRED EMBODIMENT

In the figures, reference letter A indicates the panel support table of a panel cutting machine, supported at a certain distance from the ground by a suitable base structure partly constituted by upright elements B and B1. Panel support table A is interrupted, transversely with respect to the direction of feeding of the panels, by a rectilinear slit C along which moves a crosscut saw D and above which there is provided a pressure or compacting beam E (of the type disclosed, e.g., in British Pat. No. 1,232,800).

On the support table A there is placed a stack of panels P which is displaced (see arrow F in FIG. 1) progressively beyond the cutting line defined by slit C, by means of suitable pushers (not shown) of any type known in the art. The stack of panels P is pushed so that initially (see FIG. 1) the leading edge of said stack is trimmed by the cutting saw D. Subsequently, the stack is cut at different intermediate lengths, and finally (see FIG. 3) the cutting saw D effects the trimming of the trailing edge of the said stack.

The device for discharging the initial trim or scrap P1 of the leading edge, and the final trim or scrap P2 of the trailing edge of the stack of panels P consists substantially of two table portions A1 and A2, arranged respectively at either side of the cutting line, which cutting line is more precisely defined by their adjacent edges, said table portions A1 and A2 being hinged respectively at 1 and 11 to the base uprights B and B1. A fluid pressure operated cylinder piston unit 3 is hinged by one end at 4 to the base upright B, and by its other end at 2 to the table portion A1. Similarly, a cylinder piston unit 31 is hinged at 41 to the base upright B1 and at 21 to the table portion A2. As appears evident from FIGS. 2 and 4, by feeding fluid under pressure into the cylinder piston units 3 and 31, the table portions A1, and A2 respectively, can be tilted about their hinge axes 1 and 11 so as to incline in the direction of the cutting line.

The operation of the just described trim discharging device is evident. With reference to FIG. 1, the stack of panels P is initially positioned so that the cutting saw D cuts, along the cutting line, the initial trim or scrap P1 cut from the leading edge of the stack itself. Subsequently, as shown in FIG. 2, fluid under pressure is fed into the cylinder piston unit 3, thus causing the tilting of the table portion A1 and the discharge of the trim or scrap P1 into the trim discharge zone or area Z, at the bottom of which suitable conveyors (not shown) may be provided to move away the discharged trim.

In a similar manner (see FIG. 3), when the intermediate cuts have been effected, the stack of panels P is positioned with its trailing end in the area of the cutting saw D, so that said cutting saw cuts the final trim P2 from the said trailing edge. Fluid under pressure is then fed to the cylinder piston unit 31, thus promoting the tilting of table portion A2 as shown in FIG. 4. In this manner, the final trim P2 originating from the trailing end of the stack also is discharged into the discharge area Z, from which it can subsequently be moved away.

I claim:

1. In a panel cutting machine, a device for removing or discharging the trim or scrap resulting from the rectilinear trimming of the sides of a panel or a stack of panels effected by a cutting saw operating along a rectilinear cutting line, the said panel or stack of panels being fed to the cutting line by displacement on a panel support table, wherein said support table comprises two independent tiltable portions on opposite sides of said cutting line, so as to define said cutting line with their adjacent edges, each of said edges being hinged along an axis which is parallel to the said cutting line, means being provided for causing the tilting of each of said table portions around said axis so as to incline same towards said cutting line and towards a trim discharge zone located below said cutting line.

2. A trim discharging device according to claim 1, in which the means for causing the tilting of the tiltable table portion consist of a fluid pressure operated piston and cylinder unit.

* * * * *